(12) United States Patent
Slain

(10) Patent No.: US 10,825,043 B2
(45) Date of Patent: Nov. 3, 2020

(54) METHODS AND SYSTEMS FOR PROCESSING VIEWABILITY METRICS

(71) Applicant: Yahoo Holdings, Inc., Sunnyvale, CA (US)

(72) Inventor: Ilya Slain, Santa Clara, CA (US)

(73) Assignee: Oath Inc., New York, NY (US)

( * ) Notice: Subject to any disclaimer, the term of this patent is extended or adjusted under 35 U.S.C. 154(b) by 311 days.

(21) Appl. No.: 15/421,089

(22) Filed: Jan. 31, 2017

(65) Prior Publication Data

US 2018/0218392 A1    Aug. 2, 2018

(51) Int. Cl.
    *G06Q 30/02*    (2012.01)
(52) U.S. Cl.
    CPC ..... *G06Q 30/0246* (2013.01); *G06Q 30/0277* (2013.01)
(58) Field of Classification Search
    CPC .................. G06Q 30/0246; G06Q 30/0277
    USPC ........................................ 705/14.45; 463/31
    See application file for complete search history.

(56) References Cited

U.S. PATENT DOCUMENTS

| 8,235,814 B2 * | 8/2012 | Willis | G06Q 30/02 463/31 |
| 2011/0055004 A1 * | 3/2011 | Libby | G06Q 30/02 705/14.45 |
| 2015/0242884 A1 * | 8/2015 | Goodman | G06Q 30/0246 705/14.45 |

FOREIGN PATENT DOCUMENTS

WO    WO-2008095028 A1 *  8/2008 ............. G06Q 30/02

OTHER PUBLICATIONS

Alexandra Northington, Metrics 101: Viewability, 2014 (Year: 2014).*

* cited by examiner

*Primary Examiner* — Tarek Elchanti
(74) *Attorney, Agent, or Firm* — Cooper Legal Group, LLC

(57) ABSTRACT

Methods and systems for processing viewability metrics are provided. A method includes receiving, by a processor of an online advertising platform, online advertisement viewability metrics collected by a system of an online content publisher. The online advertisement viewability metrics indicate whether a user of a user device viewed an online advertisement provided to the user device. The method further includes dividing, by the processor of the online advertising platform, the received online advertisement viewability metrics into a first online advertisement viewability metric set and a second online advertisement viewability metric set. The method further includes providing, by the processor of the online advertising platform, the first online advertisement viewability metric set to a system of a third-party analytics provider.

21 Claims, 10 Drawing Sheets

METHODS AND SYSTEMS FOR PROCESSING VIEWABILITY METRICS

BACKGROUND

This application relates generally to data processing systems. More particularly, this application relates to methods and systems for processing viewability metrics.

Online advertising has become increasingly popular as a way for advertisers to publicize information about goods and services to potential customers and clients. An advertiser can implement an advertising campaign using internet-accessible facilities of online advertisement platforms, for example Yahoo! GEMINI. The online advertisement platform serves to connect the advertiser with users accessing online resources such as search engines and news and information sites. Advertisements ("ads") of the advertiser are provided to the users to inform and attract the attention of the users.

An online advertising platform places advertisements of advertisers within content services made available to end users, for example web pages, mobile applications ("apps"), TV apps, or other audio or visual content services. The advertisements are provided along with other content. The other content may include any combination of text, graphics, audio, video, or links to such content. The advertisements are conventionally selected based on a variety of criteria including those specified by the advertiser. The advertiser conventionally defines an advertising campaign to control how and when advertisements are made available to users and to specify the content of those advertisements. The content of the advertisements themselves is sometimes referred to as advertising creative or advertising creatives.

Various monetization techniques or models may be used in connection with sponsored advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

In order for an online advertisement to inform and attract the attention of a user, it may be important that the online advertisement is viewed by the user to whom it was provided. Further, in some monetization techniques or models, a publisher is only paid for having an online advertisement displayed with its online content if the online advertisement was viewable to the user to which the online advertisement was provided. For at least these reasons, a variety of viewability metrics have been developed to indicate whether an online advertisement that was provided to a user was actually viewable to the user. However, current methods and systems for processing viewability metrics can be improved upon.

BRIEF SUMMARY

A variety of methods and systems for processing viewability metrics have been developed. Some methods and systems utilize different sets of viewability metrics compared with other methods and systems. For example, an online advertising platform such as Yahoo! GEMINI may use a particular set of viewability metrics to generate viewability analytics reports, while a third-party analytics provider such as Moat, Inc. may use a different set of viewability metrics to generate different reports such as those available on MOAT dashboards. Conventionally, collection of third-party viewability metrics involves integrating the third-party's code with an online content publisher's content, for example a webpage or mobile application. The integrated code then tracks viewability metrics of online advertisements provided along with the publisher's content, and beacons the metrics back to the MOAT system. An online advertising platform may separately measure the viewability metrics it uses to produce its reports.

This conventional technology presents a number of technical problems. First, the conventional technology requires the expenditure of time and effort to integrate third-party viewability measurement code with the content publisher's online content. Second, due to this tight integration of publisher content and third-party code, performance of the publisher system depends to some extent on the performance of that third-party code. Third, integration of the third-party code provides various risks to the publisher, such as potential security vulnerabilities and data leaks. Fourth, there is often some overlap in the types of viewability metrics used by an online advertisement platforms and a third-party analytics provider to generate viewability analytics reports. However, in the conventional technology, the online advertisement platform and the third-party have different sources for data, which can lead to discrepancies between the generated viewability analytics reports. For example, the duration of video playback could be relevant to both the online advertisement platform and the third-party analytics provider, but because the online advertisement platform and the third-party analytics provider would separately measure this viewability metric, the resulting viewability analytics reports might show a different value. Aspects of this disclosure provide one or more technical solutions to one or more of these technical problems.

A first aspect of the present disclosure provides a computer-implemented method to process online advertisement viewability metrics. The method includes receiving, by a processor of an online advertising platform, online advertisement viewability metrics collected by a system of an online content publisher. The online advertisement viewability metrics indicate whether a user of a user device viewed an online advertisement provided to the user device. The method further includes dividing, by the processor of the online advertising platform, the received online advertisement viewability metrics into a first online advertisement viewability metric set and a second online advertisement viewability metric set. The method further includes providing, by the processor of the online advertising platform, the first online advertisement viewability metric set to a system of a third-party analytics provider.

A second aspect of the present disclosure provides a non-transitory processor-readable medium storing first instructions to process online advertisement viewability metrics. The first instructions are configured to, when executed by a processor of an online advertising platform, cause the processor of the online advertising platform to perform an operation of receiving online advertisement viewability metrics collected by a system of an online content publisher. The online advertisement viewability metrics indicate whether a user of a user device viewed an online advertisement provided to the user device. The first instructions are further configured to, when executed by a processor of an online advertising platform, cause the processor of the online advertising platform to perform an operation of dividing the received online advertisement viewability metrics into a first online advertisement viewability metric set and a second online advertisement viewability metric set. The first instructions are further configured to, when executed by a processor of an online advertising platform, cause the processor of the online advertising platform to perform an operation of providing the first online advertisement viewability metric set to a system of a third-party analytics provider.

A third aspect of the present disclosure provides a server of an online advertising platform. The server includes a processor-readable medium storing first instructions to process online advertisement viewability metrics. The server further includes a processor in operative communication with the processor-readable medium and configured to execute the first instructions to perform an operation of receiving online advertisement viewability metrics collected by a system of an online content publisher. The online advertisement viewability metrics indicate whether a user of a user device viewed an online advertisement provided to the user device. The processor is further configured to execute the first instructions to perform an operation of dividing the received online advertisement viewability metrics into a first online advertisement viewability metric set and a second online advertisement viewability metric set. The processor is further configured to execute the first instructions to perform an operation of providing the first online advertisement viewability metric set to a system of a third-party analytics provider.

A fourth aspect of the present disclosure provides a computer-implemented method to process online advertisement viewability metrics. The method includes receiving, by a processor of an online advertising platform, an online advertisement viewability metric collected by a system of an online content publisher. The online advertisement viewability metric indicates whether a user of a user device viewed an online advertisement provided to the user device. The method further includes dividing, by the processor of the online advertising platform, the received online advertisement viewability metric into a first online advertisement viewability metric set and a second online advertisement viewability metric set. The method further includes providing, by the processor of the online advertising platform, the first online advertisement viewability metric set to a system of a third-party analytics provider.

These and other advantages, aspects, and novel features of the present disclosure, as well as details of illustrated embodiments thereof, will be more fully understood from the following description and drawings.

DETAILED DESCRIPTION

Figure 1:
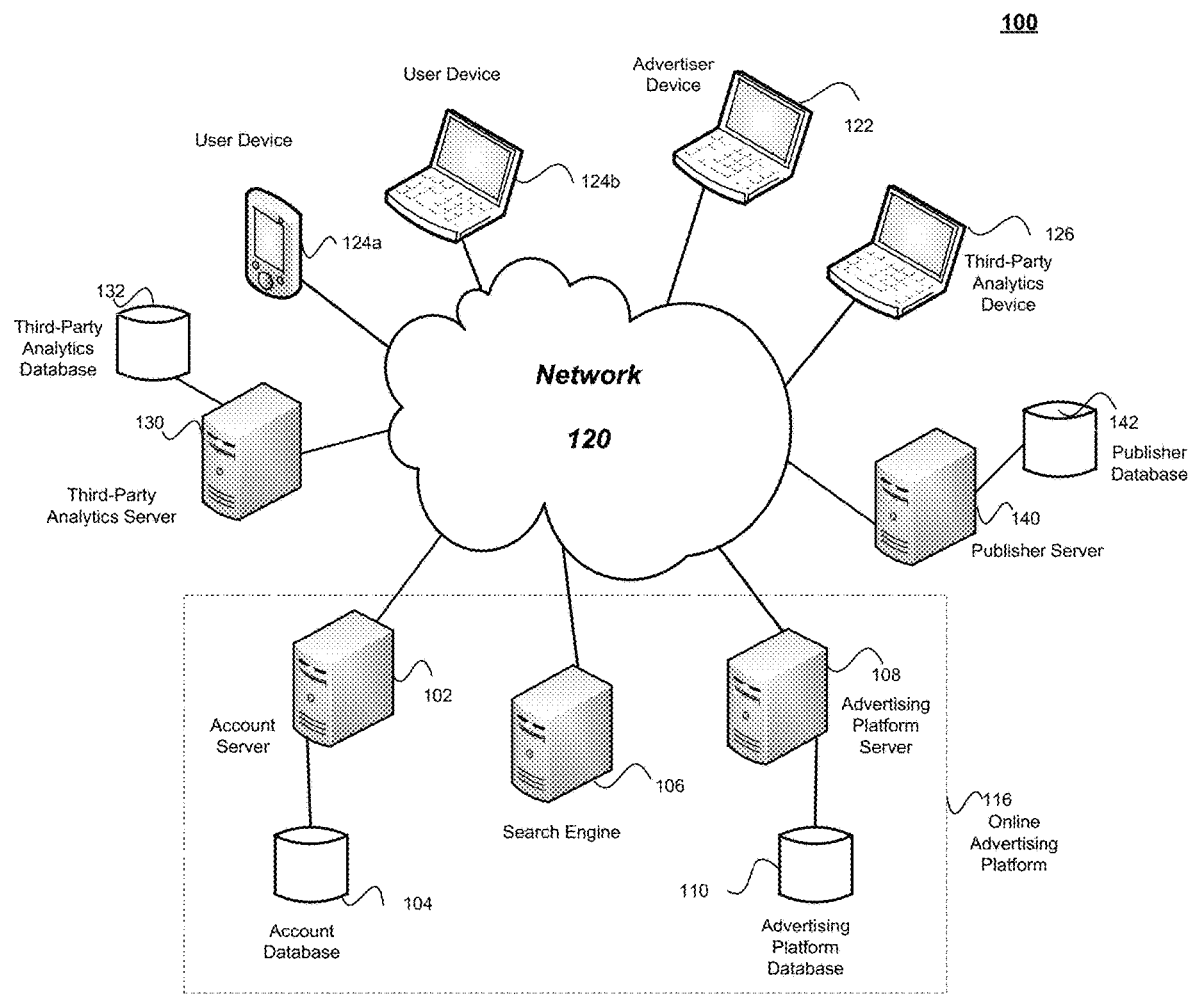
FIG. 1 is a schematic diagram illustrating an exemplary online information environment.

The present disclosure provides one or more solutions to one or more problems presented by current technologies for processing viewability metrics. As explained in the following detailed description, aspects of the present disclosure receive online advertisement viewability metrics collected by a processor of an online content publisher, divide the received online advertisement viewability metrics into a first online advertisement viewability metric set and a second online advertisement viewability metric set, and provide the first online advertisement viewability metric set to a system of a third-party analytics provider. These aspects improve upon current technologies, for example because they: (1) eliminate the expenditure of time and effort associated with integrating third-party viewability measurement code with the content publisher's online content; (2) eliminate dependence of online content publishers' performance on performance of third-party viewability metric collection code; (3) eliminate potential security vulnerabilities and data leaks associated with integrating third-party viewability metric collection code with content publishers' online content; and/or (4) eliminate discrepancies between viewability analytics reports generated by third-party analytics providers and online advertisement platforms.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the terms "based on" or "based upon" may be understood as not necessarily being intended to convey an exclusive set of factors and may, instead, allow for existence of additional factors not necessarily expressly described, again, depending at least in part on context.

FIG. 1 is a schematic diagram of an exemplary online information environment 100. Online information environment 100 may include online advertising platform 116, network 120, user device 124a, 124b, advertiser device 122, third-party analytics device 126, third-party analytics server 130, third-party analytics database 132, publisher server 140, and publisher database 142.

Online advertising platform 116 may be accessible over network 120 by one or more advertiser devices, for example advertiser device 122, and by one or more user devices, for example user device 124a, 124b. Advertisers may provide advertisements to online advertising platform 116 over network 120. Users may access content from sources over network 120 with one or more user devices, for example user device 124a, 124b. Online advertising platform 116 may place advertisements in or with the accessed content over network 120 so the advertisements may be accessed by user device 124a, 124b. In one example, online advertising platform 116 may be deployed and operated by an online provider, for example Yahoo! Inc. Online advertising platform 116 may include account server 102, account database 104, search engine 106, advertising platform server 108, and advertising platform database 110.

Account server 102 may store account information for advertisers. Account server 102 may be in data communication with account database 104. Account information may include one or more database records associated with each respective advertiser. Any suitable information may be stored, maintained, updated and read from account database 104 by account server 102. Examples include advertiser identification information, advertiser security information, for example passwords and other security credentials, and account balance information. In some embodiments, an online provider which manages online advertising platform 116 may assign one or more account managers to a respective advertiser, and information about the one or more account managers may be maintained in account database 104 as well as information obtained and recorded for subsequent access by an account manager.

Account server 102 may be implemented using any suitable device. For example, account server 102 may be implemented as a single server, a plurality of servers, or any other type of computing device known in the art. Access to account server 102 may be accomplished through a firewall, not shown, which protects the account management programs and the account information from external tampering. Additional security may be provided via enhancements to the standard communications protocols, for example Secure HTTP or the Secure Sockets Layer.

Account server 102 may provide an advertiser front end to simplify the process of accessing the account information of an advertiser. The advertiser front end may be a program, application or software routine that forms a user interface. According to example embodiments of the present disclosure, the advertiser front end may be accessible as a web site with one or more web pages that an accessing advertiser may view on an advertiser device, for example advertiser device 122. The advertiser may view and edit account data using the advertiser front end. After editing the advertising data, the account data may then be saved to account database 104.

Search engine 106 may be a computer system, one or more servers, or any other computing device known in the art. Alternatively, search engine 106 may be a computer program, instructions, or software code stored on a computer-readable storage medium that runs on a processor of a single server, a plurality of servers, or any other type of computing device known in the art. Search engine 106 may be accessed by user devices, for example user device 124a, 124b, operated by a user over network 120. User device 124a, 124b may communicate a user query to search engine 106. Search engine 106 may locate matching information using any suitable protocol or algorithm and return information to user device 124a, 124b. Search engine 106 may be designed to help users find information located on the Internet or an intranet, including for example information provided by publisher server 140 and stored in publisher database 142. According to exemplary embodiments of the present disclosure, search engine 106 may provide to user device 124a, 124b, over network 120, a web page with content including search results, information matching the context of a user inquiry, links to other network destinations or information, and files of information of interest to a user operating user device 124a, 124b.

Search engine 106 may enable a device, for example user device 124a, 124b, or any other client device, to search for files of interest using a search query. Typically, search engine 106 may be accessed by a client device via one or more servers or directly over network 120. Search engine 106 may, for example, comprise a crawler component, an indexer component, an index storage component, a search component, a ranking component, a cache, a profile storage component, a logon component, a profile builder, and one or more application program interfaces (APIs). Search engine 106 may be deployed in a distributed manner, for example via a set of distributed servers. Components may be duplicated within a network, for example for redundancy or better access.

Advertising platform server 108 may operate to serve advertisements to user devices, for example user device 124a, 124b. Advertisements include data defining advertisement information that may be of interest to a user of a user device. An advertisement may include text data, graphic data, image data, video data, or audio data. An advertisement may further include data defining one or more links to other network resources providing such data. The other locations may be other locations on the internet, other locations on an intranet operated by the advertiser, or other accessible locations. Advertisements or components of advertisements served by advertising platform server 108 may be stored in advertising platform database 110.

Advertisements may be displayed on web pages resulting from a user-defined search based at least in part upon one or more search terms, which may have been searched for using search engine 106. Advertisements may also be displayed based on content of an application or webpage that the user opens with a user device, for example user device 124a, 124b. The content may for example be provided by publisher server 140 and stored in publisher database 142. Advertising may be beneficial to users, advertisers, or web portals if displayed advertisements are relevant to interests of one or more users.

Advertising platform server 108 may include logic and data operative to format the advertisement data for communication to the user device. Advertising platform server 108 may be in data communication with advertising platform database 110. Advertising platform database 110 may store information to be utilized by online advertising platform 116, including data defining advertisements to be served to user devices. This advertisement data may be stored in platform database 110 by another data processing device or by an advertiser.

Further, advertising platform server 108 may be in data communication with network 120. Advertising platform server 108 may communicate ad data and other information to devices over network 120. This information may include advertisement data communicated to a user device. This information may also include advertisement data and other information communicated with an advertiser device, for example advertiser device 122. An advertiser operating an advertiser device 122 may access advertising platform server 108 over network 120 to access information including advertisement data. This access may include developing advertisement creatives, editing advertisement data, deleting advertisement data and other activities.

Advertising platform server 108 may provide an advertiser front end to simplify the process of accessing the advertising data of an advertiser. The advertiser front end may be a program, application or software routine that forms a user interface. In one particular embodiment, the advertiser front end is accessible as a web site with one or more web pages that an accessing advertiser may view on the advertiser device. The advertiser may view and edit advertising data using the advertiser front end. After editing the advertising data, the advertising data may then be saved to advertising platform database 110 for subsequent communication in advertisements to a user device.

Account server 102, search engine 106, and advertising platform server 108, may be implemented as any suitable computing device. A suitable computing device may be a computer system, one or more servers, or any other computing device known in the art. A computing device may be capable of sending or receiving signals, for example via a wired or wireless network, or may be capable of processing or storing signals, for example in memory as physical memory states, and may, therefore, operate as a server. Thus, devices capable of operating as a server may include, as examples, dedicated rack-mounted servers, desktop computers, laptop computers, set top boxes, integrated devices combining various features, for example two or more features of the foregoing devices, or the like. Alternatively, a server may be a computer program, instructions and/or software code stored on a computer-readable storage medium that runs on a processor of a single server, a plurality of servers, or any other type of computing device known in the art.

Network 120 may include any data communication network or combination of networks. A network may couple devices so that communications may be exchanged, for example between a server and a client device or other types of devices, including between wireless devices coupled via a wireless network, for example. A network may also include mass storage, for example network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks may employ differing architectures, may be compliant or compatible with differing protocols, or may interoperate within a larger network, for example network 120. Various types of devices may, for example, be made available to provide an interoperable capability for differing architectures or protocols. As one illustrative example, a router may provide a link between otherwise separate and independent LANs. A communication link or channel may include, for example, analog telephone lines, for example a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, for example via a telephone line or link.

Advertiser device 122 may include any data processing device which may access online advertising platform 116 over network 120. Advertiser device 122 may be operative to interact over network 120 with account server 102, search engine 106, the advertising platform server 108, content servers, for example publisher server 140, and other data processing systems, for example third-party analytics server 130. Advertiser device 122 may, for example, implement a web browser for viewing web pages and submitting user requests. Advertiser device 122 may communicate data to online advertising platform 116, including data defining web pages and other information. Advertiser device 122 may receive communications from online advertising platform 116, including data defining web pages and advertising creatives.

User device 124*a*, 124*b* may include any data processing device which may access other components of online information environment 100 over network 120. User device 124*a*, 124*b* may be operative to interact over network 120 with search engine 106. User device 124*a*, 124*b* may, for example, implement a web browser for viewing web pages and submitting user requests. A user operating user device 124*a*, 124*b* may enter a search request and communicate the search request to online advertising platform 116. The search request may be processed by search engine 106 and search results may be returned to user device 124*a*, 124*b*. In other examples, a user of user device 124*a*, 124*b* may request data, for example a page of information from one or more components of online information environment 100, including for example publisher server 140 or online advertising platform 116. The data may be provided in a computer application, a native mobile application, a TV application, or an audio application. One or more components of online information environment 100 may provide the data or redirect the browser to another web site. In addition, advertising platform server 108 may select advertisements from platform database 110 and include data defining the advertisements in the provided data to user device 124*a*, 124*b*.

Advertiser device 122 and user device 124*a*, 124*b* may each operate as a client device when accessing information in online information environment 100. A client device, for example advertiser device 122 and user device 124*a*, 124*b*, may include a computing device capable of sending or receiving signals, for example via a wired or a wireless network. A client device may, for example, include a desktop computer or a portable device, for example a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, for example features of the forgoing devices, or the like. In the example of FIG. 1, laptop computer 124b and smartphone 124a may be operated interchangeably as an advertiser device or as a user device depending upon the context.

Third-party analytics server 130, third party-analytics database 132, or a combination of third-party analytics server 130 and third-party analytics database 132 may be components of or form a third-party analytics system. A third-party analytics system may include a system, for example MOAT, INTEGRAL AD SCIENCE, or digital video analytics, that is operated separately from an online advertising platform system, for example Yahoo! GEMINI. A first system may be considered to be operated separately from a second system because, through software, hardware, or combinations thereof, the first system is not controlled by the second system, the second system is not controlled by the first system, and the first system and the second system are not under common control. For example, third-party analytics server 130 and third-party analytics database 132 are not controlled by online advertising platform 116. Additionally, online advertising platform 116 is not controlled by third-party analytics server 130 and third-party analytics database 132.

Third-party analytics server 130 may be configured to process data in a manner different from online advertising platform 116. For example, third-party analytics server 130 may be configured to use different data and/or different processing algorithms to produce analytics reports than the data and/or processing algorithms that online advertising platform 116 uses to produce analytics reports. Third-party analytics server 130 may be configured to provide analytics reports to devices, for example third-party analytics device 126, that online advertising platform 116 is not configured to provide analytics reports to. Third-party analytics server 130 may additionally or alternatively be configured to provide analytics reports to devices, for example advertiser device 122, that online advertising platform 116 is configured to provide analytics reports to. Third-party analytics database 132 may be configured to store data to be utilized by, or that is created by, third-party analytics server 130.

Publisher server 140, publisher database 142, or a combination of publisher server 140 and publisher database 142 may be components of or form a publisher system. Publisher systems may be configured to server a variety of content. In some embodiments, a publisher system may be operated separately from online advertising platform 116. For example, online advertising platform 116 may be Yahoo! GEMINI, and publisher server 140 and publisher database 142 may be controlled by a third-party publisher. In other embodiments, a publisher system and online advertising platform 116 may be under common control. For example, online advertising platform may be Yahoo! GEMINI, and publisher server 140 and publisher database 142 may be components of a publisher that is controlled by Yahoo! Inc.

Figure 2:
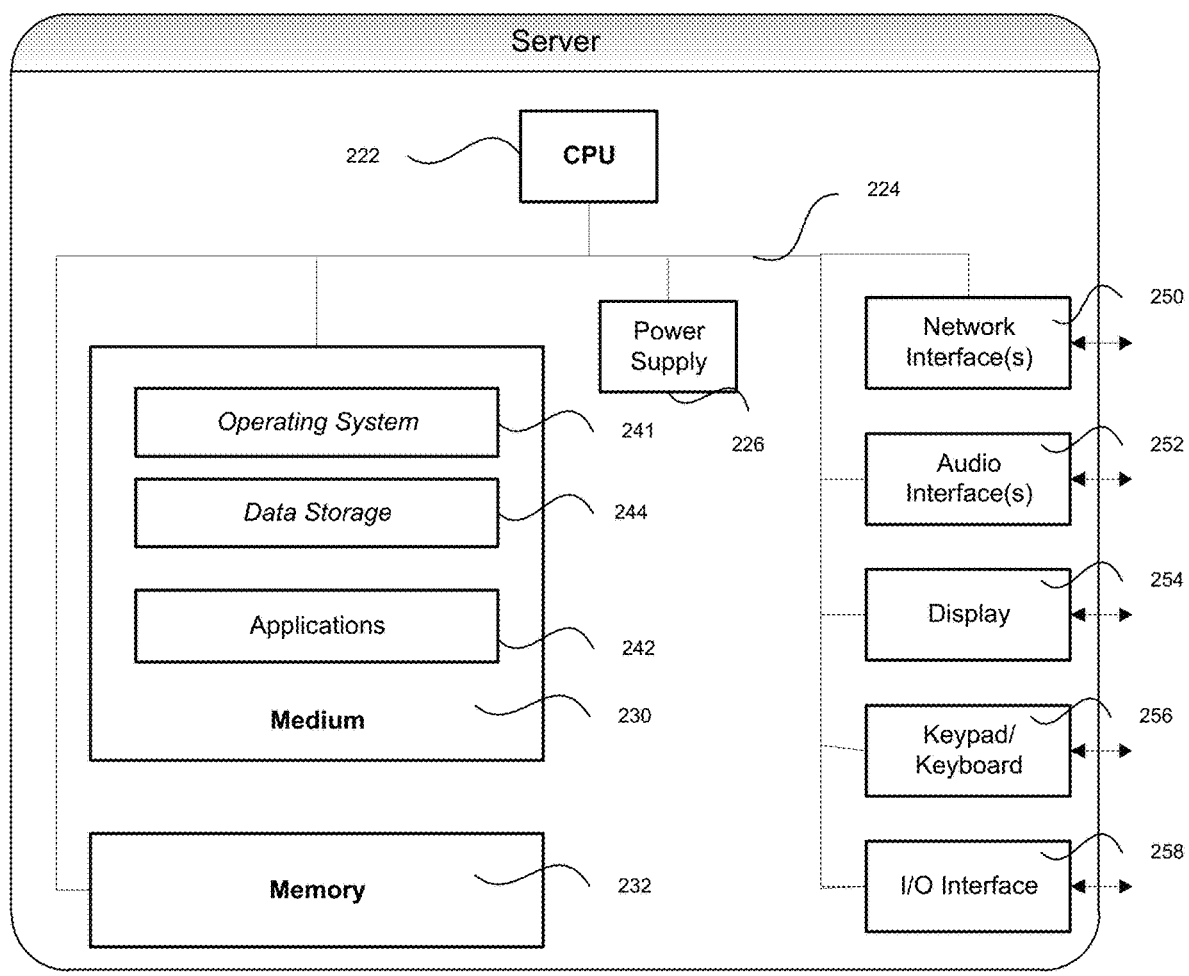
FIG. 2 is a schematic diagram illustrating an exemplary server.

FIG. 2 is a schematic diagram illustrating an exemplary server. Server 200 may be used as account server 102, search engine 106, advertising platform server 108, third-party analytics server 130, and publisher server 140 of FIG. 1. Server 200 may vary widely in configuration or capabilities, but it may include one or more central processing units 222 and memory 232, one or more media 230 (for example one or more mass storage devices) storing application programs 242 or data 244, one or more power supplies 226, one or more wired or wireless network interfaces 250, one or more audio interfaces 252, one or more displays 254, one or more keypads/keyboards 256, one or more input/output interfaces 258, and/or one or more operating systems 241, for example Windows Server™, Mac OS X™, Unix™, Linux™, FreeBSD™, or the like. The components of server 200 may be communicatively connected by a bus 224. The media 230 may store sets of instructions, or units and/or modules that include the sets of instructions, for conducting operations and/or method steps described in the present disclosure. Alternatively, the units and/or modules may be hardware disposed in the server 200 configured to conduct operations and/or method steps described in the present disclosure. The one or more processors may be configured to execute the sets of instructions and perform the operations in example embodiments of the present disclosure.

Thus server 200 may include, as examples, dedicated rack-mounted servers, desktop computers, laptop computers, set top boxes, mobile computational devices, for example smart phones, integrated devices combining various features, for example two or more features of the foregoing devices, or the like.

Account server 102, search engine 106, advertising platform server 108, third-party analytics server 130, and publisher server 140 illustrated in FIG. 1 may be implemented as content servers or may be in communication with content servers. A content server may include a device that includes a configuration to provide content via a network to another device. A content server may, for example, host a site, for example a social networking site, examples of which may include, but are not limited to, Flicker™, Twitter™, Facebook™, LinkedIn™, or a personal user site (for example a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, for example electrical signals, for example, or may be stored in memory, as physical states, for example. Examples of devices that may operate as a content server include desktop computers, multiprocessor systems, microprocessor-type or programmable consumer electronics, etc. The content servers may not be under common ownership or control with the ad server or servers. Publisher server 140 is a content server controlled by a publisher, and may serve content stored on publisher database 142.

Figure 3:
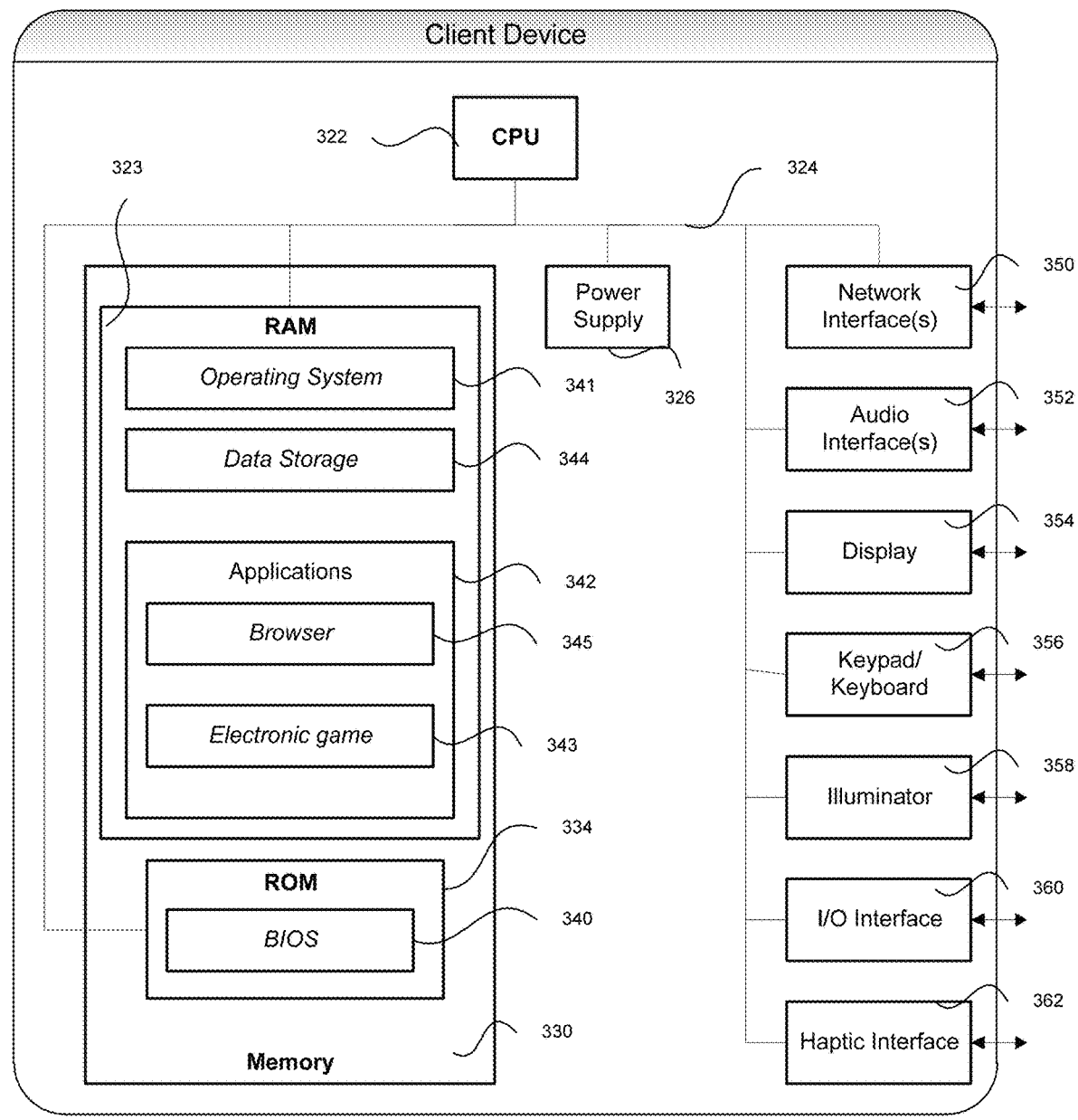
FIG. 3 is a schematic diagram illustrating an exemplary client device.

FIG. 3 is a schematic diagram illustrating an exemplary client device. Client device 300 may be used as user device 124a, 124b and advertiser device 122. A client device may include apparatuses to execute methods and software systems introduced in the present disclosure. Client device 300 may be a computing device capable of executing a software system. Client device 300 may, for example, be a personal desktop computer or a portable device, for example a laptop computer, a tablet computer, a cellular telephone, or a smart phone.

Client device 300 may vary in terms of capabilities or features. Claimed subject matter is intended to cover a wide range of potential variations. Client device 300 may include one or more non-transitory processor-readable storage media 330 and one or more processors 322 in communication with the non-transitory processor-readable storage media 330. For example, the non-transitory processor-readable storage media 330 may be a RAM memory 323, flash memory, ROM memory 334, EPROM memory, EEPROM memory, registers, hard disk, a removable disk, a CD-ROM, or any other form of non-transitory storage medium known in the art. The one or more non-transitory processor-readable storage media 330 may store sets of instructions, or units and/or modules that include the sets of instructions, for conducting operations and/or method steps described in the present disclosure. Alternatively, the units and/or modules may be hardware disposed in the client device 300 configured to conduct operations and/or method steps described in the present disclosure. The one or more processors may be configured to execute the sets of instructions and perform the operations in example embodiments of the present disclosure.

Client device 300 may include or execute a variety of operating systems 341, including an operating system, for example Windows™ or Linux™, or a mobile operating system, for example iOS™, Android™, or Windows Mobile™, which may be stored in RAM memory 323. Client device 300 may include or may execute a variety of possible applications 342, for example an electronic game 343 and a browser 345. A network interface 350 and an application 342 may enable communication with other devices via a network, for example communicating with another computer, another client device, or server via a network. Client device 300 may include an I/O interface 360, and may include or execute BIOS 340 which may be a set of firmware instructions stored in ROM 340 that control input and output operations of client device 300 via I/O interface 360.

Client device 300 may include a variety of input and output components. Client device 300 may include keypad/keyboard 356. Client device 300 may include a display 354, for example a liquid crystal display (LCD), or a display with a high degree of functionality, for example a touch-sensitive color 2D or 3D display, and an illuminator 358. In contrast, however, as another example, a web-enabled client device 300 may include one or more physical or virtual keyboards. Client device 300 may include audio interface(s) 352. Client device 300 may include haptic interface 362. Client device may include power supply 326 to power one or more of the components of client device 300, and bus 324 to communicatively connect one or more components of client device 300 with each other.

Merely for illustration, only one processor may be described in client devices and servers that execute operations and/or method steps in the following example embodiments. However, it should be noted that the client devices and servers in the present disclosure may also include multiple processors, thus operations and/or method steps that are performed by one processor as described in the present disclosure may also be jointly or separately performed by the multiple processors. For example, if in the present disclosure a processor executes both step A and step B, it should be understood that step A and step B may also be performed by two different processors jointly or separately in the client device (e.g., the first processor executes step A and the second processor executes step B, or the first and second processors jointly execute steps A and B). Furthermore, the term "processor" may include more than one processor.

Figure 4:
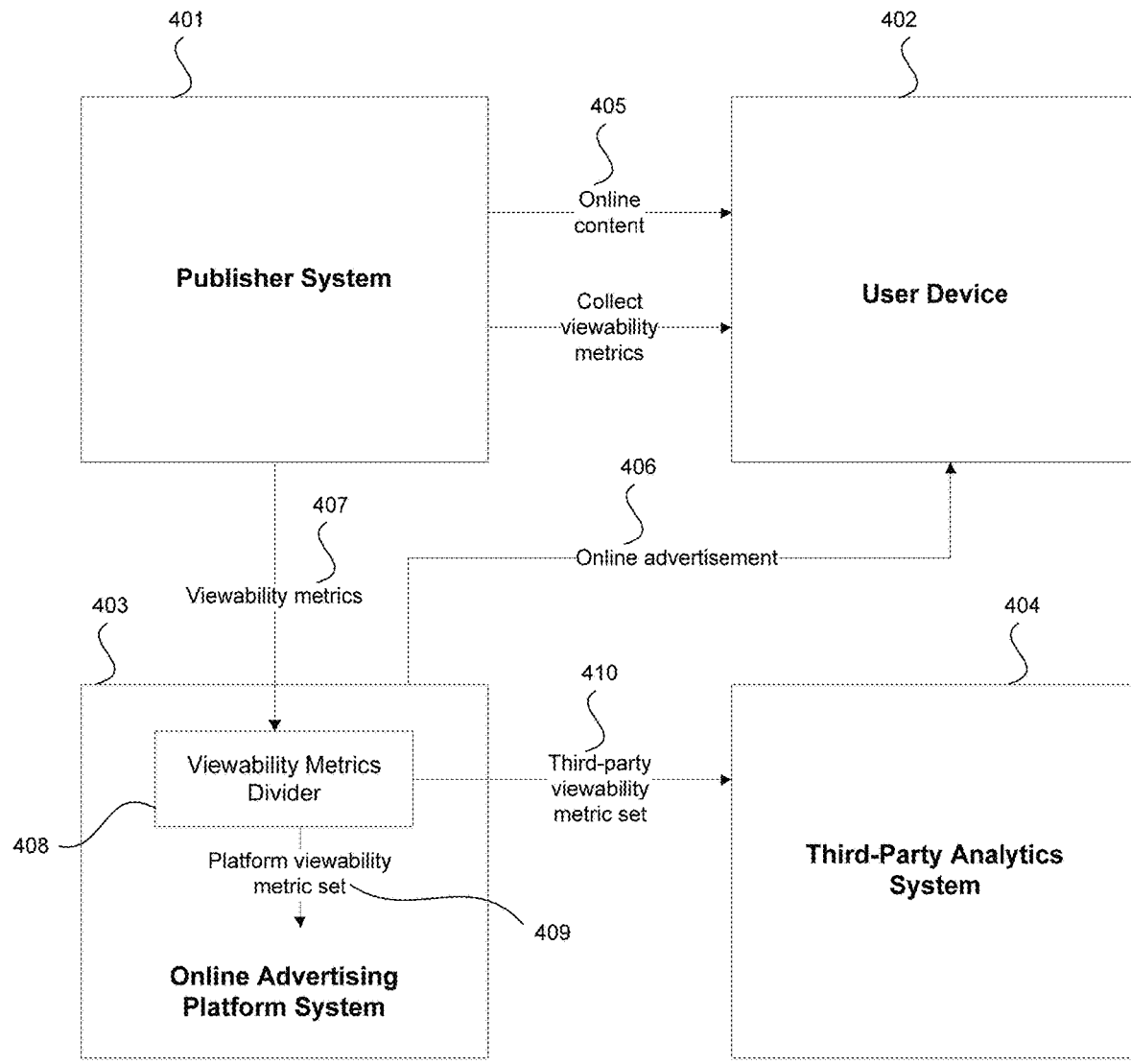
FIG. 4 is a schematic diagram illustrating an exemplary method and components for processing online advertisement viewability metrics.

FIG. 4 is a schematic diagram illustrating an exemplary method and components for processing online advertisement viewability metrics. A viewability metric generally indicates whether a user of a user device viewed information provided to the user device. For example, an online advertisement viewability metric indicates whether a user of a user device viewed an online advertisement provided to the user device. A viewability metric may be associated with one or more types of content, including for example video, images, audio, text, or combinations thereof. Viewability metrics may include display duration, percentage of pixels displayed, an indication of consecutive playback, an indication of whether the audio of the user device is on, or any other suitable metric. A viewability metric may simply include an indication (e.g. true or false) as to whether a particular viewability requirement has been satisfied for an online advertisement. Such viewability requirements may for example include a minimum percentage of pixels displayed, a minimum display duration or video playback duration, a requirement that the audio of the user device was on during display, etc., or a combination of some or all of these.

The exemplary method of FIG. 4 may involve publisher system 401, user device 402, online advertising platform system 403, and third-party analytics system 404. Publisher system 401 may for example be implemented as publisher server 140, or as publisher server 140 and publisher database 142. User device 402 may for example be implemented as user device 124*a*, 124*b*. Online advertising platform system 403 includes viewability metrics divider 408, and may for example be implemented as online advertising platform 116 or one or more components of online advertising platform 116, for example advertising platform server 108, or advertising platform server 108 and advertising platform database 110. Third-party analytics system 404 may for example be implemented as third-party analytics server 130, or as third-party analytics server 130 and third-party analytics database 132.

In the exemplary method of FIG. 4, publisher system 401 provides online content 405 to user device 402. Online advertising platform system 403 provides online advertisement 406 to user device 402 for placement with online content 405 and for display by user device 402. Online advertising platform system 403 may provide online advertisement 406 to user device 402 directly, for example by serving online advertisement 406 directly to user device 402, or indirectly, for example by serving online advertisement 406 to publisher system 401, which then serves online advertisement 406 to user device 402.

Publisher system 401 collects viewability metrics 407 that are associated with an attempt to display online advertisement 406 on user device 402. Publisher system 401 may for example collect viewability metrics 407 by directly measuring viewability metrics 407, or by measuring characteristics and generating viewability metrics 407 based upon the characteristics, for example using one or more servers of publisher system 401. Alternatively or additionally, publisher system 401 may for example collect viewability metrics 407 by causing user device 402 to directly measure viewability metrics 407, or by causing user device 402 to measure characteristics and generate viewability metrics 407 based upon the characteristics, for example by sending instructions to user device 402 to cause it to perform these acts. Such instructions sent from publisher system 401 to user device 402 may be considered a component of publisher system 401 which collects viewability metrics 407. A variety of techniques may be used to configure publisher system 401 so that it will collect viewability metrics 407. For example, publisher system 401 may be configured so that it will execute metric collection instructions, for example processor-executable code, scripts, software, and/or rules, according to which a publisher system collects viewability metrics.

Publisher system 401 may receive metric collection instructions in a variety of manners that do not involve integrating third-party metric collection code with publisher system 401. For example, online advertising platform system 403 may pre-configure publisher system 401 by embedding metric collection instructions in publisher system 401 prior to providing online advertisement 406. Alternatively or additionally, an operator of publisher system 401 may pre-configure publisher system 401 to include metric collection instructions. Alternatively or additionally, online advertising platform system 403 may provide metric collection instructions to publisher system 401 at the same time that online advertisement 406 is provided, e.g. in response to an ad request.

Using a publisher system to collect viewability metrics provides a variety of benefits not provided by current technology. For example, because a publisher system, for example publisher system 401, can be configured so that it will collect viewability metrics without needing to integrate third-party viewability code with the publisher system, various problems with current technology can be eliminated, including: (1) the need to expend time and effort to integrate third-party viewability measurement code with online content of the publisher system; (2) dependency of the performance of the publisher system on performance of third-party viewability metric collection code; and/or (3) potential security vulnerabilities and data leaks associated with integrating third-party viewability metric code with online content of the publisher system.

Once publisher system 401 collects viewability metrics 407, it provides collected viewability metrics 407 to online advertising platform system 403. Publisher system 401 may provide collected viewability metrics 407 to online advertising platform system 403 in a variety of manners. For example, publisher system 401 may transmit to online advertising platform system 403 viewability metrics 407 measured and/or generated by publisher system 401. Additionally or alternatively, publisher system 401 may transmit to online advertising platform system 403 viewability metrics 407 measured and/or generated by user device 402. Additionally or alternatively, publisher system 401 may cause user device 402 to transmit to online advertising platform system 403 viewability metrics 407 measured and/or generated by user device 402, for example by sending instructions to user device 402 to cause it to perform these acts. Such instructions sent from publisher system 401 to user device 402 may be considered a component of publisher system 401 which provides viewability metrics 407 to online advertising platform system 403. Accordingly, it should be understood that although the arrow that is associated with viewability metrics 407 in FIG. 4 is depicted as being between publisher system 401 and online advertising platform system 403, that arrow also reflects embodiments in which publisher system 401 causes user device 402 to transmit viewability metrics 407 directly to online advertising platform system 403.

Publisher system 401 may provide one or more of the viewability metrics of viewability metrics 407 to online advertising platform system 403 at a different time from when it provides one or more of the other viewability metrics of viewability metrics 407 to online advertising platform system 403. For example, publisher system 401 may provide a plurality of viewability metrics of viewability metrics 407 to online advertising platform system 403 as a plurality of respective data transmissions that are sent at different times, which may respectively correspond to when a given viewability metric is collected. This configuration may avoid buffering and improve performance of publisher system 401. Alternatively, publisher system 401 may provide each viewability metric of viewability metrics 407 at the same time it provides each other viewability metric of viewability metrics 407, for example as a single data transmission.

When viewability metrics divider 408 receives collected viewability metrics 407, viewability metrics divider 408 divides the collected viewability metrics 407 into platform viewability metric set 409 and third-party viewability metric set 410. A viewability metric set may include a single viewability metric or a plurality of viewability metrics. Viewability metrics divider 408 may be configured to divide viewability metrics 407 into viewability metric sets based upon the contents and/or nature of viewability metrics 407, for example to help ensure that the viewability metrics of viewability metrics 407 can be efficiently routed to systems that can utilize them. A platform viewability metric set may include one or more viewability metrics that an online advertising platform system is pre-configured to receive, process (for example by producing reports based thereon), and provide to a party, for example an advertiser. A third-party viewability metric set may include one or more viewability metrics that a third-party analytics system is configured to receive, process (for example by producing reports based thereon), and provide to a party, for example an advertiser. Two viewability metric sets that are divided from each other may include entirely different viewability metrics from each other. Alternatively, there may be partial or complete overlap of viewability metrics that are included in two viewability metric sets that are divided from each other. For example, if online advertising platform system 403 and third-party analytics system 404 both use a particular viewability metric of viewability metrics 407 in their respective processing, viewability metrics divider 408 may divide viewability metrics 407 so that both platform viewability metric set 409 and third-party viewability metric set 410 include that particular viewability metric.

Viewability metrics divider 408 provides third-party viewability metric set 410 to third-party analysis system 404. Viewability metrics divider 408 may further provide platform viewability metric set 409 to a component of online advertising platform system 403. In embodiments where a given viewability metric set includes a plurality of viewability metrics, viewability metrics divider 408 may provide one or more of the viewability metrics of the set at a different time from when it provides one or more of the other viewability metrics of the set. For example, viewability metrics divider 408 may provide the viewability metrics of third-party viewability metric set 410 as a plurality of data transmissions that are sent at different times, which may respectively correspond to when a given viewability metric is received by viewability metrics divider 408. This configuration may avoid buffering and improve performance of online advertising platform system 403. Alternatively, viewability metrics divider 408 may provide each viewability metric of a set at the same time it provides each other viewability metric of the set, for example as a single data transmission.

Because the method of FIG. 4 as described above includes receiving viewability metrics from a publisher system, dividing the received viewability metrics into a plurality of viewability metric sets, and providing a resulting viewability metric to a third-party analysis system, it provides benefits not provided by current technology. This is particularly true in implementations in which two different systems (e.g. third-party analytics systems and/or online advertising platform systems) each use a same viewability metric in their respective processing. For example, if in association with a single attempted display of an online ad, a given viewability metric (e.g. percentage of pixels of the online ad that are rendered) is collected twice according to two different viewability metric collection codes that are associated with two different systems (e.g. MOAT and INTEGRAL AD SCIENCES), differences in the viewability metric collection codes may lead the two systems to associate different respective values (e.g. 30% of pixels rendered vs. 50% of pixels rendered) with the given viewability metric. This may lead to a variety of discrepancies between an analytics report that is produced by one of the systems and an analytics report that is produced by the other of the systems, for example if both reports are based upon that viewability metric. The method of FIG. 4 helps to eliminate this type of discrepancy. For example, publisher system 401 may collect a given viewability metric of viewability metrics 407 once as instructed by one set of metric collection instructions. Viewability metrics divider 408 may then divide viewability metrics 407 into platform viewability metric set 409 and third-party viewability metric set 408, each of which include the same value for the given viewability metric. Viewability metrics divider 408 may then respectively provide the metric sets to online advertising platform system 403 and third-party analytics system 404. In this method, discrepancies in reports generated by online advertising platform system 403 and third-party analytics system 404 can be avoided, because the two systems each receive the same value of the given viewability metric to work with.

Figure 5:
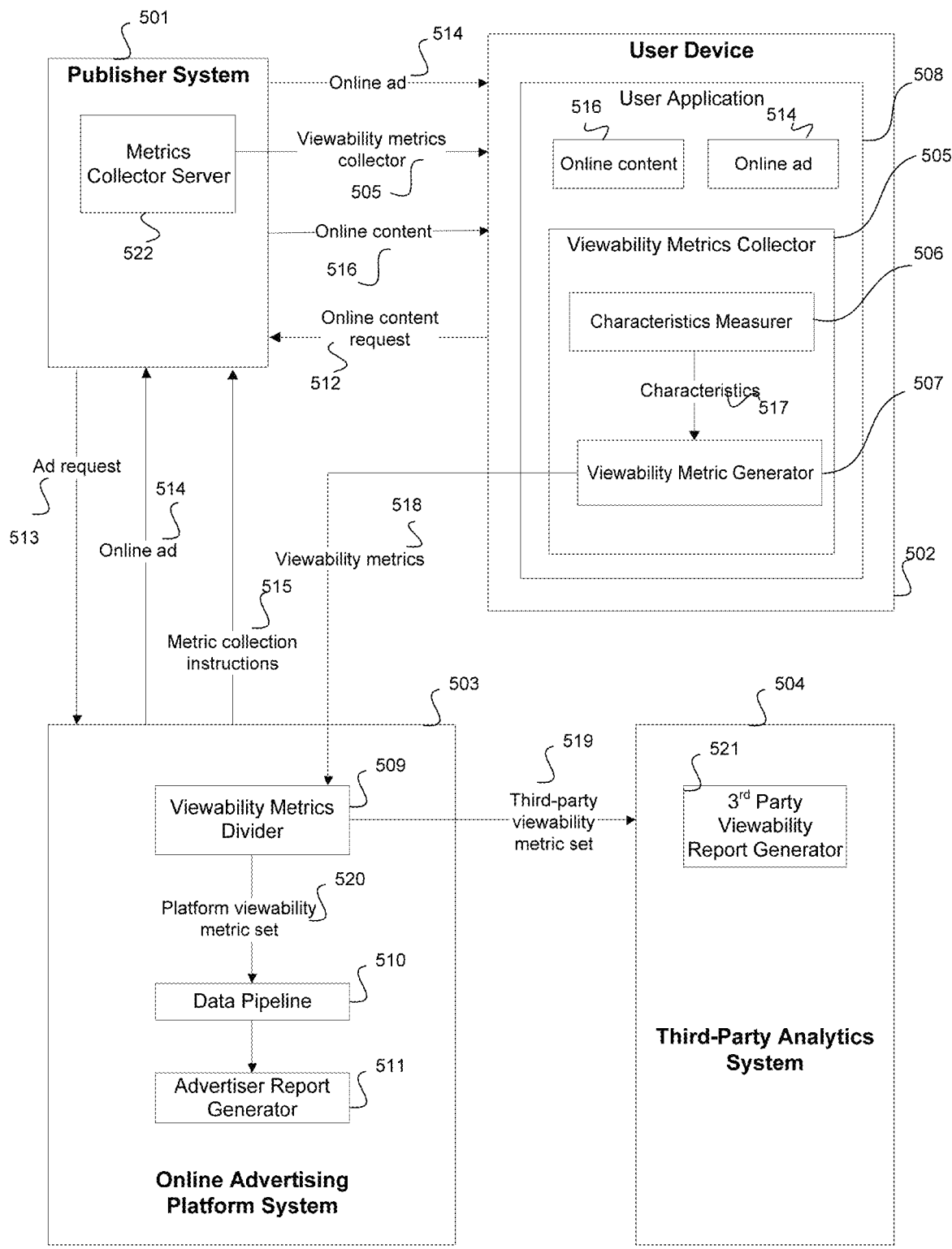
FIG. 5 is a schematic diagram illustrating an exemplary method and components for processing online advertisement viewability metrics.

FIG. 5 is a schematic diagram illustrating an exemplary method and components for processing online advertisement viewability metrics. The exemplary method illustrated in FIG. 5 may describe particular implementations of aspects of the method illustrated in FIG. 4. For example, the exemplary method of FIG. 5 may describe implementations in which a publisher system collects viewability metrics and provides them to an online advertising platform system by causing a user device to measure and/or generate one or more viewability metrics and transmit them to the online advertising platform system.

The exemplary method of FIG. 5 may involve publisher system 501, user device 502, online advertising platform system 503, and third-party analytics system 504. Publisher system 501 may include a metrics collector server 522, and may be an implementation of publisher system 401. User device 502 may include user application 508, and may be an implementation of user device 402. User application 508 is generally an application that can display online content and an online ad, for example a browser or a mobile application. User application 508 may load provided online content 516, online ad 514, and viewability metrics collector 505. Viewability metrics collector 505 may include a characteristics measurer 506 and a viewability metric generator 507. Viewability metrics collector 505 may be a component of publisher system 501 that is configured to run on user device 502 in association with user application 508. Viewability metrics collector 505 may for example be processor-executable instructions implemented using JAVASCRIPT (e.g. if the user application is a browser) or using native IOS, ANDROID, C #, or JAVA code (e.g. if the user application is a mobile application). Online advertising platform system 503 may include viewability metrics divider 509, data pipeline 510, and advertiser report generator 511, and may be an implementation of online advertising platform system 403. Third-party analytics system 504 may include third-party viewability report generator 521, and may be an implementation of third-party analytics system 404.

In the exemplary embodiment of FIG. 5, user device 502 sends online content request 512 to publisher system 501. When publisher system 501 receives online content request 512, in response publisher system 501 sends an ad request 513 to online advertising platform system 503. When online advertising platform system 503 receives ad request 513, in response online advertising platform system 503 provides online ad 514 to publisher system 501. In some embodiments, online advertising platform system 503 may also provide metric collection instructions 515 to publisher system 501 in response to receiving ad request 513. This may allow publisher system 501 to customize its collection of viewability metrics to a currently served online ad in a manner defined by online advertising platform system 503. Metrics collector server 522 may execute metric collection instructions 515 to, based upon aspects of online ad 514 and/or online content 516, configure viewability metrics collector 505 for execution by user device 502. For example, metrics collector server 522 may execute metric collection instructions 515 to, based upon aspects of online ad 514 and/or online content 516, select viewability metrics collector 505 from a database and integrate it with online content 516. Metrics collector server 522 may further execute metric collection instructions 515 to, after selecting viewability metrics collector 505, modify it based upon aspects of online ad 514 and/or online content 516. Alternatively, metrics collector server 522 may execute metric collection instructions 515 to, based upon aspects of online ad 514 and/or online content 516, generate viewability metrics collector 505 and integrate it with online content 516. As discussed further below, the manner in which metrics collector server 522 configures viewability metrics collector 505 may determine various operations that user device 502 performs in the collection of viewability metrics. When publisher system 501 receives ad request 513, publisher system 501 provides online ad 514, online content 516, and viewability metrics collector 505 to user device 502.

When user device 502 receives online content 516 and online ad 514, user application 508 loads and attempts to cause user device 502 to display online ad 514 with online content 516. Characteristics measurer 506 then measures characteristics 517 of an interaction of user device 502 with online ad 514 and provides characteristics 517 to viewability metric generator 507. Characteristics of an interaction of a user device with an online ad may include durations of aspects of the interaction, states of the user device during the interaction, quantities of aspects of the interaction, and other characteristics that are suitable to be used as, or suitable to be used to generate, one or more metrics indicative of whether a user viewed the online ad. In some embodiments, characteristics measurer 506 measures characteristics 517 according to metric collection instructions 515. Metric collection instructions 515 may configure characteristics measurer 506 regarding which characteristics to measure and/or how to measure characteristics. For example, if online ad 514 is a streaming video online advertisement, metric collection instructions 515 that are sent with online ad 514 may configure characteristics measurer 506 to measure video playback of online ad 514 on user device 502. This may allow for publisher system 501 to further customize its collection of viewability metrics to a currently served online ad in a manner defined by online advertising platform system 503.

Viewability metric generator 507 receives characteristics 517 and generates a plurality of viewability metrics 518 based upon characteristics 517, and the viewability metrics 518 are then sent to viewability metrics divider 509. In some embodiments, viewability metric generator 507 generates viewability metrics 518 according to metric collection instructions 515. This may allow publisher system 502 to further customize its collection of viewability metrics to a currently served online ad in a manner defined by online advertising platform system 503. Metric collection instructions 515 may configure viewability metrics generator 507 to perform processing on characteristics 517 to generate viewability metrics 518 that will be recognizable to online advertising platform system 503. Suitable processing may include formatting characteristics 517 into a form that will be recognized by online advertising platform system 503, applying an algorithm to one or more of characteristics 517 that outputs viewability metrics 518, and/or any other suitable processing that generates viewability metrics 518. For example, if metric collection instructions 515 configure characteristics measurer 506 to measure video playback of online ad 514 on user device 502, metric collection instructions 515 may further configure viewability metric generator 507 to determine a display duration of online ad 514 on user device 502 based upon the measured video playback, and to format the determined display duration (e.g. "5 seconds") so that online advertising platform system 503 will recognize it as a viewability metric with that value. As another example, if metric collection instructions 515 configure characteristics measurer 506 to measure percentage of pixels of the online advertisement that are viewably displayed, metric collection instruction 515 may further configure viewability metric generator 507 to determine whether the measured percentage satisfies a requirement that a minimum percentage of pixels be viewably displayed, and to format a resulting indication (e.g. "True") so that online advertising platform system 503 will recognize it as a viewability metric with that meaning. These steps of generating viewability metrics 518 may help to ensure that viewability metrics 518 can then be efficiently routed by online advertising platform system 503 to systems configured to utilize them to produce accurate viewability analytics reports.

Additionally, prior to or upon sending viewability metrics 518 to online advertising platform system 503, viewability metrics collector 505 may tag each viewability metric of the viewability metrics 518 with one or more identifiers configured to indicate one or more intended recipients of the respective viewability metric. Metric collection instructions 515 may further configure viewability metrics collector 505 regarding which identifiers should be used to tag which viewability metrics. For example, metric collection instructions 515 may configure viewability metrics collector 505 to tag the generated display duration of online ad 514 with an identifier indicating it should be sent to third-party analytics system 504, and may instruct viewability metrics collector 505 to tag a generated percentage of pixels displayed of online ad 514 with an identifier indicating it should be sent to data pipeline 510. This tagging can further help to ensure that viewability metrics are eventually routed by online advertising platform system 503 to systems configured to utilize them. Viewability metrics collector 505 may additionally or alternatively generate one or more ad beacons that include one or more viewability metrics of viewability metrics 518, and transmit the one or more ad beacons to online advertising platform system 503. In some embodiments, the one or more viewability metrics that are included in the one or more ad beacons may be tagged with identifiers indicating their respective intended recipients.

When viewability metrics divider 509 receives viewability metrics 518, viewability metrics divider 509 divides viewability metrics 518 into third-party viewability metric set 519 and platform viewability metric set 520. Viewability metrics divider 509 may divide viewability metrics 518 in a variety of manners. For example, viewability metrics divider 509 may examine each received viewability metric to determine if it is of a type that should be assigned to one or more particular metric sets, and then assign it to one or more appropriate metric sets. In other words, viewability metrics divider 509 may be pre-configured to recognize specific types of viewability metrics and to route them to a system that is set up to receive them and produce viewability analysis reports based on them. Alternatively or additionally, viewability metrics divider 509 may examine each received viewability metric to determine if it includes an identifier indicating an intended recipient, for example an identifier added by viewability metrics collector 505, and assign the viewability metric to a metric set that is then provided to the intended recipient. This configuration may similarly allow viewability metrics divider 509 to route viewability metrics to a system that is set up to receive them and produce viewability analytics reports based on them. This latter configuration may be preferable if it is more desirable to reduce processing burden for online advertising platform system 503, while the former configuration may be preferable if it is more desirable to reduce processing burden for publisher system 501.

Viewability metrics divider 509 provides third-party viewability metric set 519 to third-party analytics system 504. For example, prior to or upon dividing viewability metrics 518 into third-party viewability metric set 519 and platform viewability metric set 520, viewability metrics divider 509 may generate one or more server-side beacons that include third-party viewability metric set 519. To generate the one or more server-side beacons, viewability metrics divider may translate and/or transform viewability metrics 518 into a third-party specific syntax or format associated with and configured to be recognized by a specific third-party analytics system 504. Viewability metrics divider 509 may further transmit the generated one or more server-side beacons to third-party analytics system 504. In some embodiments, third-party viewability metric set 519 is received by third-party viewability report generator 521. Third-party viewability report generator 521 may be configured to utilize the viewability metrics in the one or more server-side beacons that contain third-party viewability metric set 519 to generate viewability analytics reports that can be accessed by advertisers. For example, third-party viewability report generator 521 could be a component of MOAT that produces reports using its proprietary algorithms, which advertisers may access through a MOAT Dashboard webpage. In some embodiments, viewability metrics divider 509 may further provide platform viewability metric set 520 to data pipeline 510. In some embodiments, data pipeline 510 provides platform viewability metric 520 to advertiser report generator 511. Advertiser report generator 511 may be configured to utilize the viewability metrics in platform viewability metric set 520 to generate different viewability analytics reports that can also be accessed by advertisers but in a different manner. For example, advertiser report generator 511 could be a component of Yahoo! GEMINI that produces different reports according to its own proprietary processing algorithms, which advertisers may access through a Yahoo! GEMINI access webpage.

As may be apparent from the above description of the method of FIG. 5, the detailed components and operations of FIG. 5 provide benefits described above in connection with the method of FIG. 4, and show how those benefits may be provided in a manner that efficiently measures, and routes to different analytics report producing systems, a plurality of viewability metrics that are customized to the individual online ads on which they are based.

Figure 6:
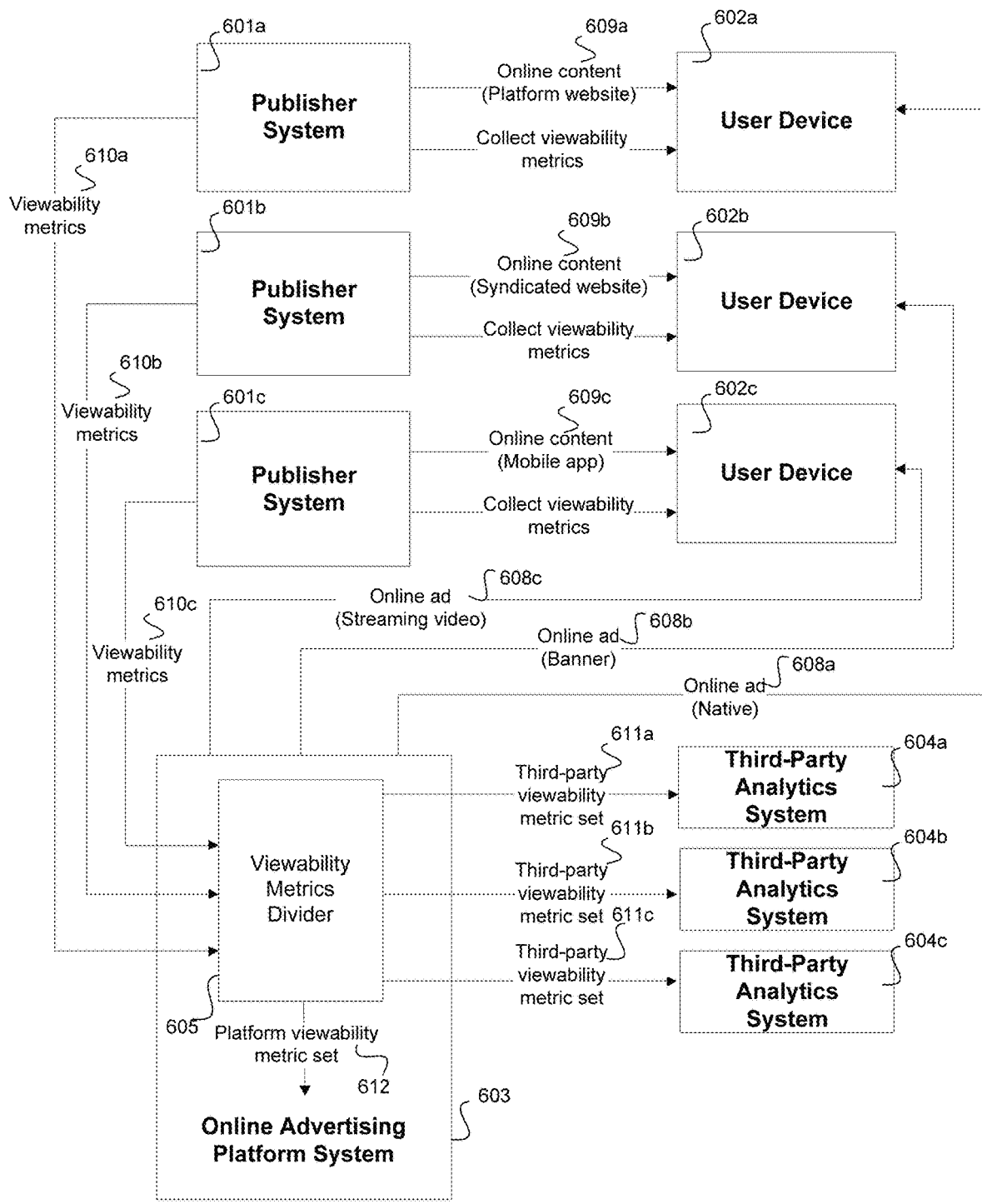
FIG. 6 is a schematic diagram illustrating an exemplary method and components for processing online advertisement viewability metrics.

FIG. 6 is a schematic diagram illustrating an exemplary method and components for processing online advertisement viewability metrics in an environment including a plurality of publisher systems, a plurality of user devices, and a plurality of third-party analytics systems. The exemplary method illustrated in FIG. 6 may be a particular implementation of a method illustrated in FIG. 4 or FIG. 5. The following discussion of FIG. 6 will help explain how various benefits discussed above in connection with exemplary methods of FIGS. 4 and 5 may be amplified in environments with multiple publisher systems, user devices, and third-party analytics systems, and how new benefits may be provided. The exemplary method of FIG. 6 may involve a plurality of publisher systems, for example publisher systems 601a, 601b, and 601c, a plurality of user devices, for example user devices 602a, 602b, and 602c, an online advertising platform system 603, and a plurality of third-party analytics systems, for example third-party analytics systems 604a, 604b, and 604c.

Each publisher system 601a, 601b, and 601c may separately include all of the components of, and be configured to operate in the same manner as, publisher system 401 or publisher system 501 as described above in connection with FIG. 4 or FIG. 5. Each user device 602a, 602b, and 602c may separately include all of the components of, and be configured to operate in the same manner as, user device 402 or user device 502 as described above in connection with FIG. 4 or FIG. 5. Online advertising platform system 603 may include all of the components of online advertising platform 403 or online advertising platform 503 as described above in connection with FIG. 4 or 5. Online advertising platform 603 may be configured to operate in generally the same manner as online advertising platform 403 or online advertising platform 503, with any changes needed to receive and divide a plurality of viewability metrics from a plurality of publishing systems as described in further detail below.

Publisher systems 601a, 601b, and 601c may operate separately from each other. For example, publisher system 601a may be a publisher of a website controlled by Yahoo!, publisher system 601b may be a website controlled by a third-party publisher, and publisher system 601c may be a publisher of a mobile application controlled by a different third-party publisher.

User devices 602a, 602b, and 602c may be distinct devices, may be used by distinct users, and/or may run distinct software platforms. For example, user device 602a may be a laptop computer that is running Windows 10™ and that is used by a first user. User device 602b may be an iPhone™ that is running iOS™ and that is used by a different second user. User device 602c may be a tablet device that is running Android™ and that is used by a different third user. Alternatively, user devices 602a, 602b, and 602c may have overlap in device identity, user identity, and/or software platform.

In the exemplary method of FIG. 6, each publisher system provides respective online content to a respective user device, and online advertising platform system 603 provides a respective online ad to each user device. For example, publisher system 601a provides online content 609a to user device 602a and online advertising platform system 603 provides online ad 608a to user device 602a. In an exemplary embodiment, online content 609a may be a Yahoo! Inc. website and online ad 608a may be a native online advertisement. Publisher system 601b provides online content 609b to user device 602b and online advertising platform system 603 provides online ad 608b to user device 602b. In an exemplary embodiment, online content 609b may be a syndicated third-party website and online ad 608b may be an online banner advertisement. Publisher system 601c provides online content 609c to user device 602c and online advertising platform system 603 provides online ad 608c to user device 602c. In an exemplary embodiment, online content 609c may be a mobile application and online ad 608c may be a streaming video advertisement. Online advertising platform system 603 may directly or indirectly provide online ads, for example online ads 608a, 608b, and 608c, to user devices, for example user devices 602a, 602b, and 602c. For example, online advertising platform 603 may directly serve an online ad to a user device, or may indirectly serve an online ad online advertisement to a publisher system, which then serves the online ad to the user device.

The user devices attempt to display the respective online ads with the respective online content. The publisher systems collect respective viewability metrics associated with interactions of the user devices with the respective online ads and send the viewability metrics to online advertising platform system 603. For example, user device 602a receives online ad 608a and online content 609a and attempts to display online ad 608a and online content 609a together. Publisher system 601a collects viewability metrics 610a and sends viewability metrics 610a to online advertising platform system 603. User device 602b receives online ad 608b and online content 609b and attempts to display online ad 608b and online content 609b together. Publisher system 601b collects viewability metrics 610b and sends viewability metrics 610b to online advertising platform system 603. User device 602c receives online ad 608c and online content 609c and attempts to display online ad 608c and online content 609c together. Publisher system 601c collects viewability metrics 610c and sends viewability metrics 610c to online advertising platform system 603. Publisher systems 601a, 601b, and 601c may send viewability metrics 610a, 610b, and 610c to online advertising platform system 603 at the same time as each other or at different times from each other.

When online advertising platform system 603 receives viewability metrics from the publisher systems, online advertising platform system 603 divides the viewability metrics into a plurality of viewability metrics sets and provides the viewability metrics sets to a plurality of systems. Online advertising platform system 603 may include viewability metrics divider 605. Viewability metrics divider 605 may for example receive viewability metrics 610a, 610b, and 610c, and divide viewability metrics 610a, 610b, and 610c into third-party viewability metric sets 611a, 611b, and 611c and platform viewability metric set 612. Viewability metrics divider 605 may include a plurality of viewability metrics dividers, for example a plurality of implementations of viewability metrics divider 408 or a plurality of implementations of viewability metrics divider 509. Alternatively or additionally, viewability metrics divider 605 may be a single viewability metrics divider configured to receive and divide viewability metrics from a plurality of publisher systems.

A given viewability metric set may include viewability metrics collected by one or more of publisher systems 601a, 601b, and 601c. For example, third-party viewability metric set 611a may include a plurality of viewability metrics collected from user device 602a by publisher 601a and a plurality of viewability metrics collected from user device 602c by publisher 601c. Third-party viewability metric set 611b may include a single viewability metric collected from user device 602c by publisher 601c. Third-party viewability metric set 611c may include a single viewability metric collected from user device 602a by publisher 601a, a plurality of viewability metrics collected from user device 602b by publisher 601b, and a plurality of viewability metrics collected from user device 602c by publisher 601c. Platform viewability metric set 612 may include a single viewability metric collected from user device 602b by publisher 601b and a plurality of viewability metrics collected from user device 602c by publisher 602. These exemplary viewability metric sets illustrate that viewability metrics divider 605 is capable of receiving viewability metrics from a plurality of publisher systems and user devices and dividing them into appropriate metric sets. A wide variety of other resulting viewability metrics are possible as may be suitable in the art. A given publisher system may collect viewability metrics from a plurality of user devices. Alternatively or additionally, a plurality of publisher systems may collect viewability metrics from a given user device.

After the viewability metrics are divided into viewability metric sets, the viewability metric sets are provided to various devices or systems configured to utilize them for further processing, for example viewability analytics report production. For example, online advertising platform system 603 provides third-party viewability metric set 610a to third-party analytics system 604a (e.g. MOAT), provides third-party viewability metric set 610b to third-party analytics system 604b (e.g. INTEGRAL AD SCIENCE), provides third-party viewability metric set 610c to third-party analytics system 604c (e.g. a digital video analytics system), and provides platform viewability metric set 612 to a component of online advertising platform system 603 (e.g. Yahoo! GEMINI).

The exemplary method of FIG. 6 as described above illustrates how benefits discussed above in connection with the exemplary method of FIG. 4 may be amplified when the method is expanded to include a plurality of publisher systems and a plurality of third-party analytics systems. For example, if there are a large number of third-party analytics systems, using current technology each of the third-party analytics systems would be required to embed its viewability metric code on each publisher system that is desired to be used to collect viewability metrics. The number of necessary acts of embedding would thus grow rapidly as the numbers of third-party analytics systems and publisher systems grow. However, by implementing viewability metrics collection in a manner consistent with the method of FIG. 6, the publisher systems would only require enough metric collection instructions to collect all of the viewability metrics required by the third-party analytics systems for their processing (e.g. viewability analytics report production). Each viewability metric that is used by more than one third-party analytics system would reduce the total number of metric collection instructions without affecting the number of different viewability analytics reports that could be produced. Thus in a large system, implementing viewability metrics collection in a manner consistent with the method of FIG. 6 would eliminate a substantial expenditure of time and effort associated with integrating third-party viewability measurement code with content publishers' online content. Furthermore, it would eliminate a substantial number of potential system-wide security vulnerabilities and data leaks and potential discrepancies between viewability analytics reports generated by third-party analytics providers and the online advertisement platform. Additionally, it would allow third-party analytics systems to more easily expand their processing algorithms to use additional viewability metrics that are already being received by viewability metrics divider 605. For example, rather than needing to edit the viewability metrics collection code on each publisher system from which viewability metric collection is desired, a third-party analytics system would merely need to request that viewability metrics divider 605 begin including the additional viewability metric in its viewability metric set. Another benefit provided by the present disclosure is that upon future standardization of viewability metric collection instructions, once a third party analytics system is configured to support that standard, it would not need to update its software development kits (SDKs) and libraries that run on publisher mobile applications and web pages in order to support the standard and future revisions of the standard. At most, the third-party analytics provider may need to update the system's interface specification for receiving third-party viewability metric sets and/or its third-party analytics report generator. A variety of other benefits of implementing viewability metric collection according to one or more methods of the present disclosure may be apparent to those skilled in the art with the benefit of the present disclosure.

Figure 7:
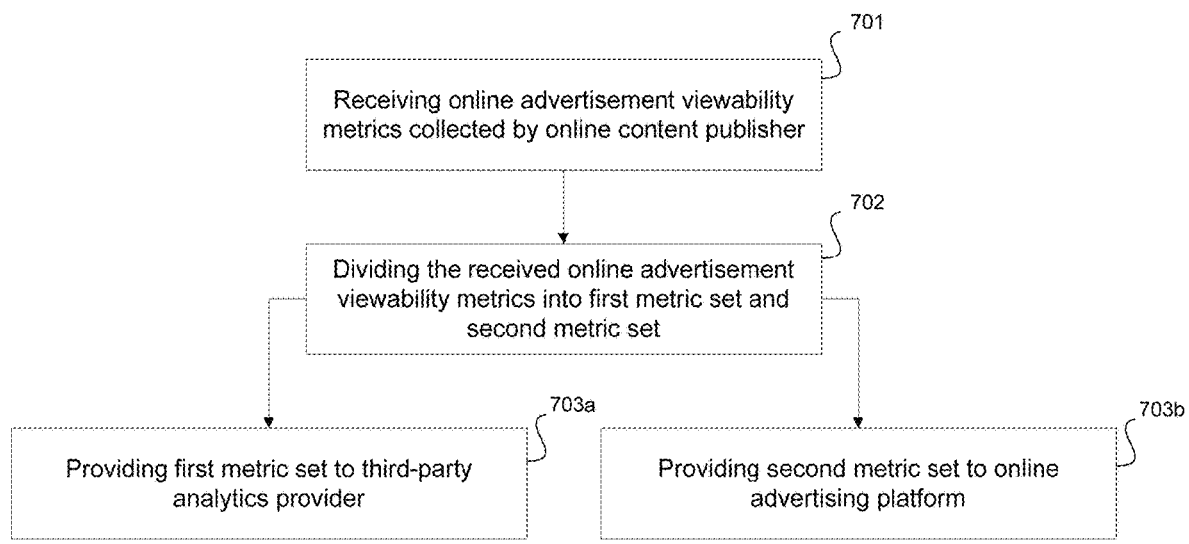
FIG. 7 is a flow chart illustrating an exemplary an exemplary method and components for online advertisement viewability metrics.

FIG. 7 is a flow chart illustrating an exemplary method of processing online advertisement viewability metrics. The exemplary method illustrated in FIG. 7 may be executed by an online advertising platform system, or one or more components thereof, for example online advertising platform system 403, online advertising platform system 503, online advertising platform system 603, or one or more components thereof. In step 701, online advertisement viewability metrics collected by an online content publisher are received. In step 702, the received online advertisement viewability metrics are divided into a first metric set and a second metric set. In step 703a, the first metric set is provided to a third-party analytics provider. In step 703b, the second metric set is provided to a component of the online advertising platform.

Figure 8:
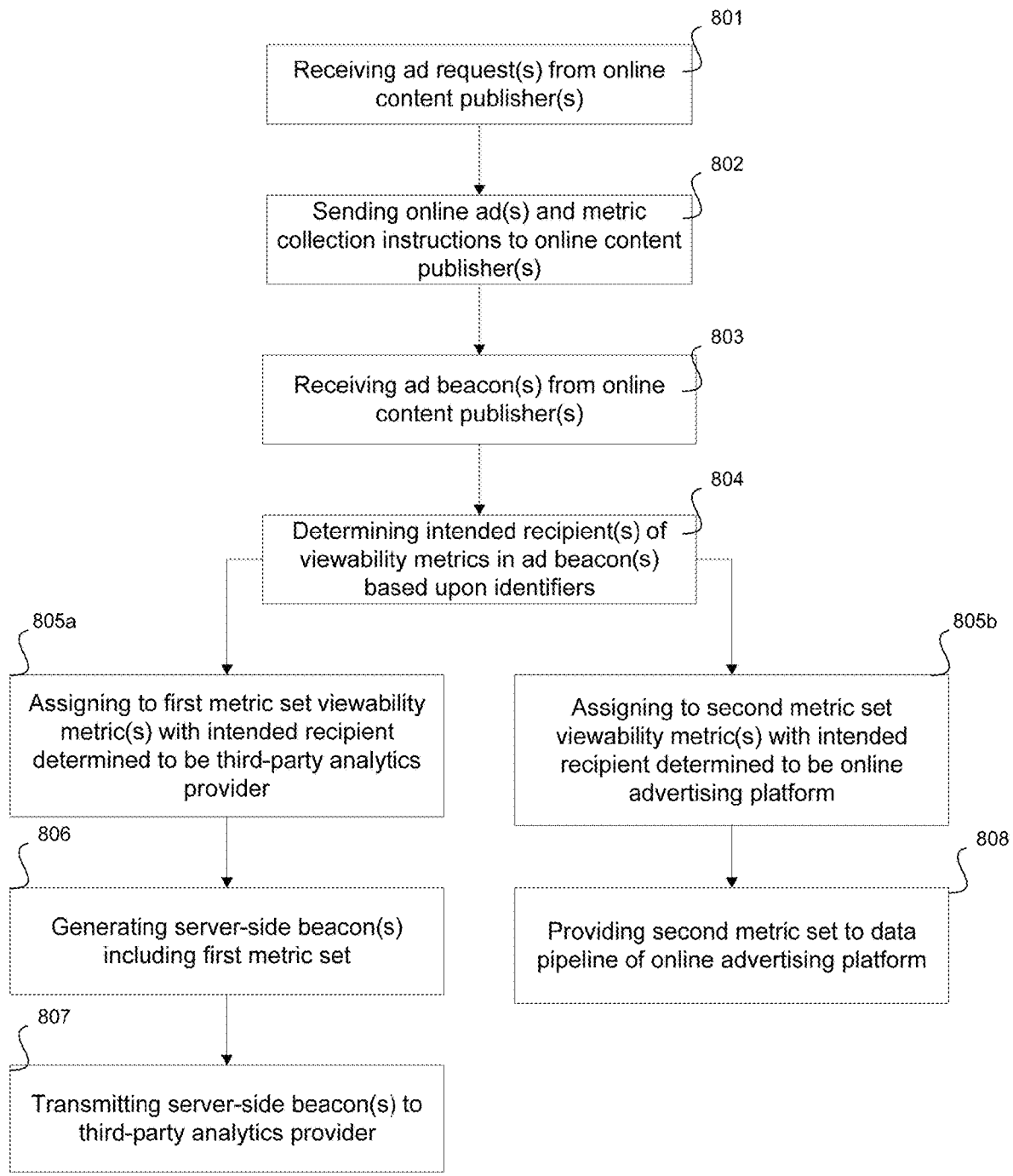
FIG. 8 is a flow chart illustrating an exemplary method of processing online advertisement viewability metrics.

FIG. 8 is a flow chart illustrating an exemplary method of processing online advertisement viewability metrics. The exemplary method illustrated in FIG. 8 may be a particular implementation of the method illustrated in FIG. 7. The exemplary method illustrated in FIG. 8 may be executed by an online advertising platform system, or one or more components thereof, for example online advertising platform system 403, online advertising platform system 503, or online advertising platform system 603, or one or more components thereof. In step 801, one or more ad requests are received from one or more online content publishers. In step 802, one or more online ads and one or more metric collection instructions are sent to one or more online content publishers. In step 803, one or more ad beacons are received from one or more online content publishers. In step 804, one or more intended recipients of viewability metrics in the one or more ad beacons are determined based upon identifiers with which the viewability metrics are tagged. In step 805a, one or more viewability metrics that have been determined to have a third-party analytics provider as the intended recipient are assigned to a first metric set. In step 806, one or more server-side beacons that include the first metric set are generated. In step 807, the one or more server-side beacons are transmitted to the third-party analytics provider. In step 805b, one or more viewability metrics that have been determined to have the online advertising platform as the intended recipient are assigned to a second metric set. In step 808, the second metric set is provided to a data pipeline of the online advertising platform.

Figure 9:
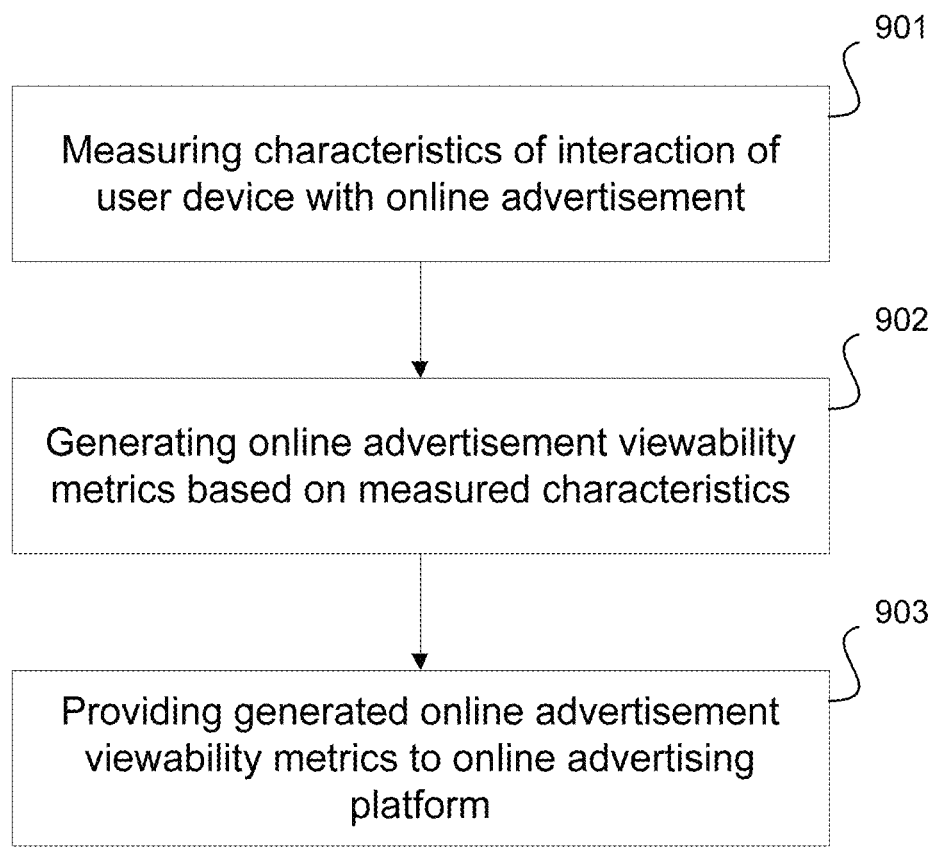
FIG. 9 is a flow chart illustrating an exemplary method of processing online advertisement viewability metrics.

FIG. 9 is a flow chart illustrating an exemplary method of processing online advertisement viewability metrics. The exemplary method illustrated in FIG. 9 may be executed by a publisher system, for example publisher system 401, publisher system 501, publisher system 601a, publisher system 601b, or publisher system 601c, or one or more components thereof, for example viewability metrics collector 505, or characteristics measurer 506 and viewability metric generator 507, running on a publisher system server. The exemplary method illustrated in FIG. 9 may be executed by a user device, for example user device 402, user device, 502, user device 602a, user device 602b, or user device 602c, or one or more components thereof, for example through execution of viewability metrics collector 505, or characteristics measurer 506 and viewability metric generator 507, received from a publisher system. In step 901, characteristics of an interaction of a user device with an online advertisement are measured. In step 902, online advertisement viewability metrics are generated based on the measured characteristics. In step 903, the generated online advertisement viewability metrics are provided to the online advertising platform.

Figure 10:
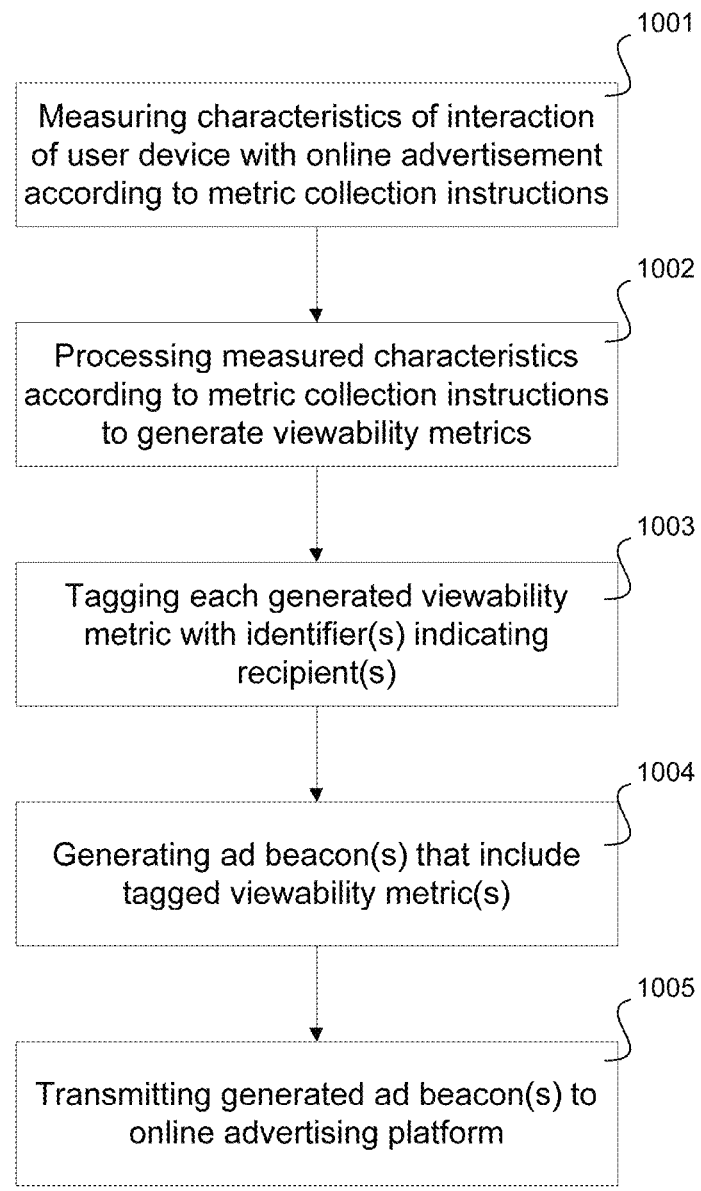
FIG. 10 is a flow chart illustrating an exemplary method of processing online advertisement viewability metrics.

FIG. 10 is a flow chart illustrating an exemplary method of processing online advertisement viewability metrics. The exemplary method illustrated in FIG. 10 may be executed by a publisher system, for example publisher system 401, publisher system 501, publisher system 601a, publisher system 601b, or publisher system 601c, or one or more components thereof, for example viewability metrics collector 505, or characteristics measurer 506 and viewability metric generator 507, running on a publisher system server. The exemplary method illustrated in FIG. 9 may be executed by a user device, for example user device 402, user device, 502, user device 602a, user device 602b, or user device 602c, or one or more components thereof, for example through execution of viewability metrics collector 505, or characteristics measurer 506 and viewability metric generator 507, received from a publisher system. In step 1001, characteristics of an interaction of a user device with an online advertisement are measured according to metric collection instructions. In step 1002, measured characteristics are processed according to metric collection instructions in order to output viewability metrics. In step 1003, each output viewability metric is tagged with one or more identifiers indicating one or more intended recipients of the output viewability metric. In step 1004, one or more ad beacons that include one or more tagged viewability metrics are generated. In step 1005, the one or more generated ad beacons are transmitted to an online advertising platform.

Exemplary implementations described in the present disclosure discuss dividing a plurality of viewability metrics into a platform viewability metric set and a third-party implementation set. It should be clear that the present disclosure also includes implementations in which a single viewability metric is similarly collected and divided into a platform viewability metric set and a third-party viewability metric. For example, the present disclosure includes implementations where viewability metrics 407 are replaced with a single viewability metric that is collected and divided into platform viewability metric set 409 and third-party viewability metric set 410 in a manner similar to or the same as is described above with reference to viewability metrics 407. Similarly, the present disclosure includes implementations where: viewability metrics 518 are replaced with a single viewability metric; viewability metrics 610a are replaced with a single viewability metric; viewability metrics 610b are replaced with a single viewability metric; and viewability metrics 610c are replaced with a single viewability metric. In some implementations, when a single viewability metric is divided into a platform viewability metric set and a third-party viewability metric set, the resulting platform viewability metric set and third-party viewability metric set may each include the single viewability metric. For example, in some implementations, the same collected viewability metric may be bifurcated and provided to the online advertising platform system and the third-party analytics system.

As shown in the above systems and methods, the present disclosure provides one or more solutions to one or more problems presented by current technologies for processing viewability metrics. By receiving online advertisement viewability metrics collected by a processor of an online content publisher, dividing the received online advertisement viewability metrics into a first online advertisement viewability metric set and a second online advertisement viewability metric set, and providing the first online advertisement viewability metric set to a system of a third-party analytics provider, aspects of the present disclosure: (1) eliminate the expenditure of time and effort associated with integrating third-party viewability measurement code with the content publisher's online content; (2) eliminate dependence of online content publishers' performance on performance of third-party viewability metric collection code; (3) eliminate potential security vulnerabilities and data leaks associated with integrating third-party viewability metric collection code with content publishers' online content; and/or (4) eliminate discrepancies between viewability analytics reports generated by third-party analytics providers and online advertisement platforms.

While exemplary embodiments have been particularly shown and described with reference to FIGS. 1-10, it will be understood by one of ordinary skill in the art that various changes in form and details may be made therein without departing from the spirit and scope of exemplary embodiments, as defined by the following claims. The exemplary embodiments, therefore, are provided merely to be illustrative and subject matter that is covered or claimed is intended to be construed as not being limited to any example embodiments set forth herein. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The foregoing detailed description is, therefore, not intended to be taken in a limiting sense.

I claim:

1. A computer-implemented method to process online advertisement viewability metrics, comprising:
   receiving, by a processor of an online advertising platform, online advertisement viewability metrics collected by a system of an online content publisher, wherein the online advertisement viewability metrics indicate whether a user of a user device viewed an online advertisement provided to the user device;
   dividing, by the processor of the online advertising platform, the online advertisement viewability metrics into a first online advertisement viewability metric set and a second online advertisement viewability metric set based upon a determination that the first online advertisement viewability metric set comprises viewability metrics that can be utilized by a third-party analytics system and the second online advertisement viewability metric set comprises viewability metrics that can be utilized by an online advertising platform system, wherein the first online advertisement viewability metric set comprises one or more first viewability metrics different than one or more second viewability metrics included in the second online advertisement viewability metric set; and responsive to the first online advertisement viewability metric set corresponding to the third-party analytics system, providing, by the processor of the online advertising platform, the first online advertisement viewability metric set but not the second online advertisement viewability metric set to the third-party analytics system.

2. The computer-implemented method of claim 1, comprising:

responsive to the second online advertisement viewability metric set corresponding to the online advertising platform system, providing, by the processor of the online advertising platform, the second online advertisement viewability metric set but not the first online advertisement viewability metric set to the online advertising platform system.

3. The computer-implemented method of claim 1, comprising providing, by the processor of the online advertising platform, to the system of the online content publisher, instructions configured to cause the system of the online content publisher to initiate operations of:

collecting the online advertisement viewability metrics by:
measuring an interaction of one or more user devices with the online advertisement, and
generating the online advertisement viewability metrics based upon the interaction, wherein the instructions define the online advertisement viewability metrics that are generated; and providing the online advertisement viewability metrics to the processor of the online advertising platform.

4. The computer-implemented method of claim 3, wherein the providing the online advertisement viewability metrics comprises including a third-party identifier that associates the third-party analytics system with a portion of the online advertisement viewability metrics.

5. The computer-implemented method of claim 4, wherein the dividing the online advertisement viewability metrics into the first online advertisement viewability metric set and the second online advertisement viewability metric set is based upon the third-party identifier.

6. The computer-implemented method of claim 3, wherein to initiate the operations of collecting the online advertisement viewability metrics and providing the online advertisement viewability metrics to the processor of the online advertising platform, the instructions cause the online content publisher to perform operations comprising:

configuring a viewability metrics collector to be executed by a processor of the one or more user devices to cause the processor of the one or more user devices to perform the operations of collecting the online advertisement viewability metrics and providing the online advertisement viewability metrics to the processor of the online advertising platform; and providing the viewability metrics collector to the one or more user devices.

7. The computer-implemented method of claim 1, wherein at least one of:

the receiving the online advertisement viewability metrics comprises receiving an ad beacon that comprises the online advertisement viewability metrics; or the providing the first online advertisement viewability metric set to the third-party analytics system comprises sending, from a server of the online advertising platform to the third-party analytics system, a server-side beacon that comprises the first online advertisement viewability metric set.

8. A non-transitory processor-readable medium storing first instructions to process online advertisement viewability metrics, the first instructions configured to, when executed by a processor of an online advertising platform, cause the processor of the online advertising platform to perform operations of:

receiving online advertisement viewability metrics collected by a system of an online content publisher, wherein the online advertisement viewability metrics indicate whether a user of a user device viewed an online advertisement provided to the user device;

dividing the online advertisement viewability metrics into a first online advertisement viewability metric set and a second online advertisement viewability metric set based upon a determination that the first online advertisement viewability metric set comprises viewability metrics that can be utilized by an online advertising platform system and the second online advertisement viewability metric set comprises viewability metrics that can be utilized by a third-party analytics system, wherein the second online advertisement viewability metric set comprises one or more first viewability metrics different than one or more second viewability metrics included in the first online advertisement viewability metric set; and responsive to the first online advertisement viewability metric set corresponding to the online advertising platform system, providing the first online advertisement viewability metric set but not the second online advertisement viewability metric set to the online advertising platform system.

9. The non-transitory processor-readable medium of claim 8, wherein the first instructions are configured to, when executed by the processor of the online advertising platform, cause the processor of the online advertising platform to perform an operation of:

providing the second online advertisement viewability metric set to the third-party analytics system.

10. The non-transitory processor-readable medium of claim 8, wherein the first instructions are configured to, when executed by the processor of the online advertising platform, cause the processor of the online advertising platform to perform an operation of providing, to the system of the online content publisher, second instructions configured to cause the system of the online content publisher to initiate operations of:

collecting the online advertisement viewability metrics by:
measuring an interaction of the user device with the online advertisement, and
generating the online advertisement viewability metrics based upon the interaction, wherein at least one of the first instructions or the second instructions define the online advertisement viewability metrics that are generated; and providing the online advertisement viewability metrics to the processor of the online advertising platform.

11. The non-transitory processor-readable medium of claim 10, wherein the providing the online advertisement viewability metrics comprises including a third-party identifier that associates the third-party analytics system with a portion of the online advertisement viewability metrics.

12. The non-transitory processor-readable medium of claim 11, wherein the dividing the online advertisement viewability metrics into the first online advertisement viewability metric set and the second online advertisement viewability metric set is based upon the third-party identifier.

13. The non-transitory processor-readable medium of claim 10, wherein to initiate the operations of collecting the online advertisement viewability metrics and providing the online advertisement viewability metrics to the processor of the online advertising platform, the second instructions cause the online content publisher to perform operations comprising:
configuring a viewability metrics collector to be executed by a processor of the user device to cause the processor of the user device to perform the operations of collecting the online advertisement viewability metrics and providing the online advertisement viewability metrics to the processor of the online advertising platform; and
providing the viewability metrics collector to the user device.

14. The non-transitory processor-readable medium of claim 8, wherein at least one of:
the receiving the online advertisement viewability metrics comprises receiving an ad beacon that comprises the online advertisement viewability metrics; or
the providing the first online advertisement viewability metric set to the online advertising platform system comprises sending, from a server of the online advertising platform to the online advertising platform system, a server-side beacon that comprises the first online advertisement viewability metric set.

15. A server of an online advertising platform, the server comprising:
a processor-readable medium storing first instructions to process one or more online advertisement viewability metrics; and
a processor in operative communication with the processor-readable medium and configured to execute the first instructions to perform operations of:
receiving online advertisement viewability metrics collected by a system of an online content publisher, wherein the online advertisement viewability metrics indicate whether a user of a user device viewed an online advertisement provided to the user device;
dividing the online advertisement viewability metrics into a first online advertisement viewability metric set and a second online advertisement viewability metric set based upon a determination that the first online advertisement viewability metric set comprises viewability metrics that can be utilized by a third-party analytics system and the second online advertisement viewability metric set comprises viewability metrics that can be utilized by an online advertising platform system; and
responsive to the first online advertisement viewability metric set corresponding to the third-party analytics system, providing the first online advertisement viewability metric set but not the second online advertisement viewability metric set to the third-party analytics system.

16. The server of claim 15, wherein the processor of the server is configured to execute the first instructions to perform an operation of:
providing the second online advertisement viewability metric set to the online advertising platform system.

17. The server of claim 15, wherein the processor of the server is configured to execute the first instructions to perform an operation of providing, to the system of the online content publisher, second instructions configured to cause the system of the online content publisher to initiate operations of:
collecting the online advertisement viewability metrics by:
measuring an interaction of the user device with the online advertisement, and
generating the online advertisement viewability metrics based upon the interaction, wherein at least one of the first instructions or the second instructions define the online advertisement viewability metrics that are generated; and
providing the online advertisement viewability metrics to the processor of the server.

18. The server of claim 17, wherein the providing the online advertisement viewability metrics comprises including a third-party identifier that associates the third-party analytics system with a portion of the online advertisement viewability metrics.

19. The server of claim 18, wherein the dividing the online advertisement viewability metrics into the first online advertisement viewability metric set and the second online advertisement viewability metric set is based upon the third-party identifier.

20. The server of claim 17, wherein to initiate the operations of collecting the online advertisement viewability metrics and providing the online advertisement viewability metrics to the processor of the online advertising platform, the second instructions cause the online content publisher to perform operations comprising:
configuring a viewability metrics collector to be executed by a processor of the user device to cause the processor of the user device to perform the operations of collecting the online advertisement viewability metrics and providing the online advertisement viewability metrics to the processor of the server; and
providing the viewability metrics collector to the user device.

21. A computer-implemented method to process online advertisement viewability metrics, comprising:
receiving, by a processor of an online advertising platform, an online advertisement viewability metric collected by a system of an online content publisher, wherein the online advertisement viewability metric indicates whether a user of a user device viewed an online advertisement provided to the user device;
dividing, by the processor of the online advertising platform, the online advertisement viewability metric into a first online advertisement viewability metric set and a second online advertisement viewability metric set based upon a determination that the first online advertisement viewability metric set comprises viewability metrics that can be utilized by an online advertising platform system and the second online advertisement viewability metric set comprises viewability metrics that can be utilized by a third-party analytics system; and responsive to the first online advertisement viewability metric set corresponding to the online advertising platform system, providing, by the processor of the online advertising platform, the first online advertisement viewability metric set to the online advertising platform system.

* * * * *